United States Patent [19]

McDermott et al.

[11] 4,193,497
[45] Mar. 18, 1980

[54] STORAGE AND SHIPPING CONTAINER

[75] Inventors: Peter McDermott, Irvington; Lazzaro A. Fattori, Woodcliff Lake, both of N.J.

[73] Assignee: Plastic Reel Corporation of America, Carlstadt, N.J.

[21] Appl. No.: 886,369

[22] Filed: Mar. 14, 1978

[51] Int. Cl.² ............... B65D 85/67; B65D 11/16
[52] U.S. Cl. ................... 206/387; 206/403; 220/4 B; 220/469
[58] Field of Search ............ 206/387, 403, 404, 459, 206/309; 220/469, 4 B, 4 E; 40/10 R

[56] References Cited

U.S. PATENT DOCUMENTS

| 2,481,095 | 9/1949 | Essman | 206/403 |
|---|---|---|---|
| 3,112,966 | 12/1963 | Reid | 206/309 |
| 3,169,682 | 2/1965 | Hollingsworth | 206/404 |
| 3,896,929 | 7/1975 | Mills | 206/387 |
| 3,921,798 | 11/1975 | Dean et al. | 206/459 |
| 4,054,206 | 10/1977 | Kobayashi et al. | 206/387 |

*Primary Examiner*—William T. Dixson, Jr.
*Attorney, Agent, or Firm*—Blum, Kaplan, Friedman, Silberman & Beran

[57] ABSTRACT

A molded container provided for use in the storage and shipping of such items as film or videotape cassettes. The container locates the cassette so that the walls of the cassette are isolated against shocks occurring to the container. The container provides mounts for releasably securing end and mailing labels to the container and includes openings for carrying the container.

12 Claims, 8 Drawing Figures

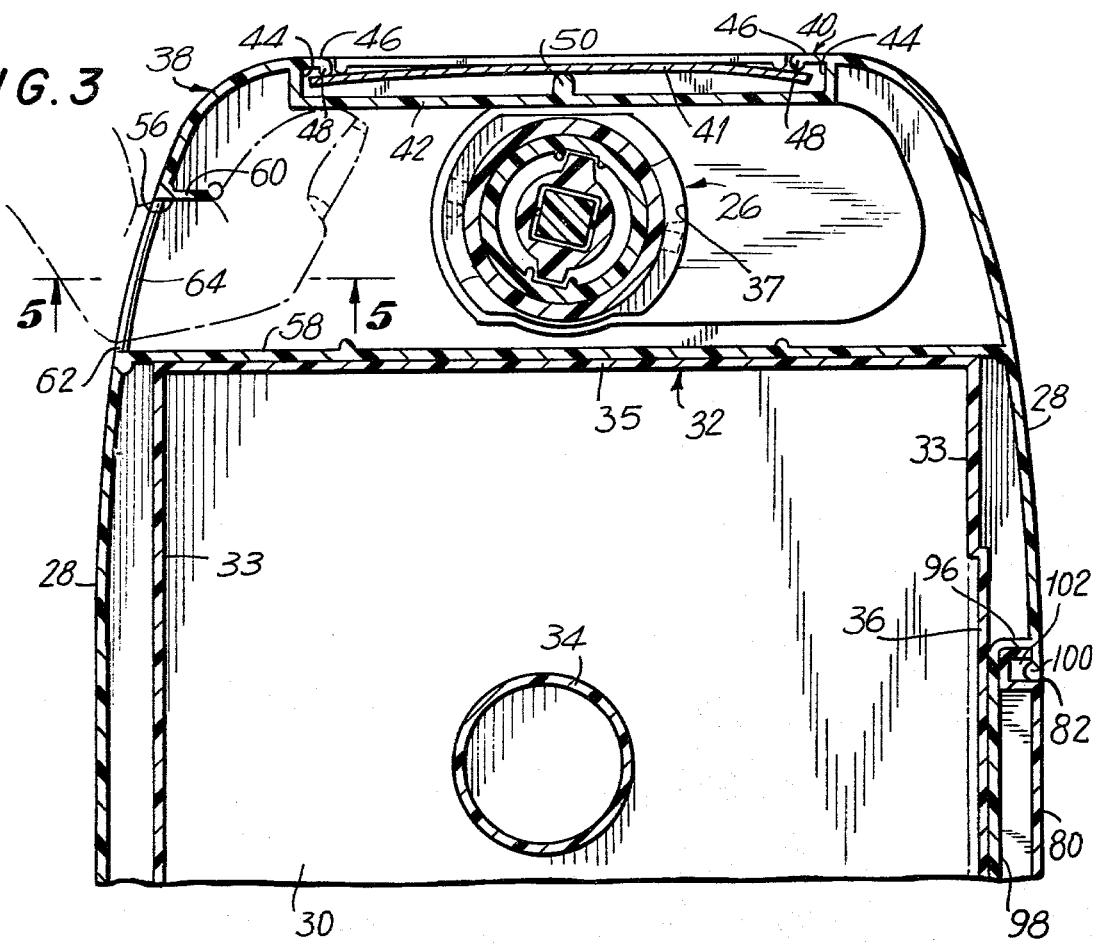
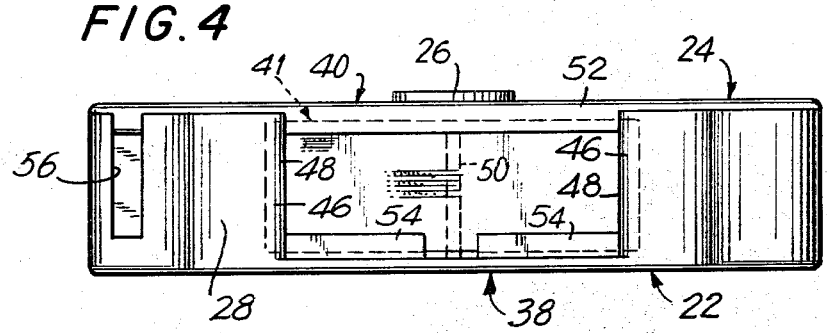
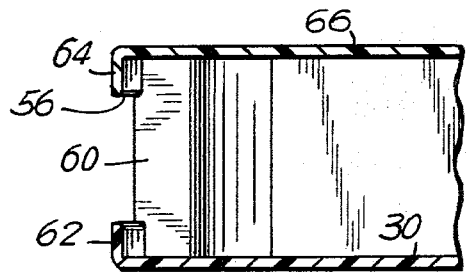

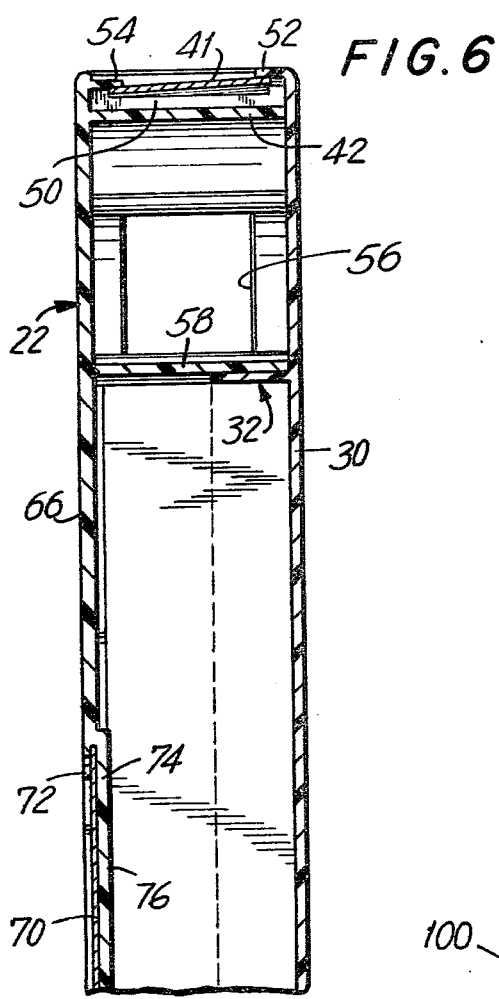
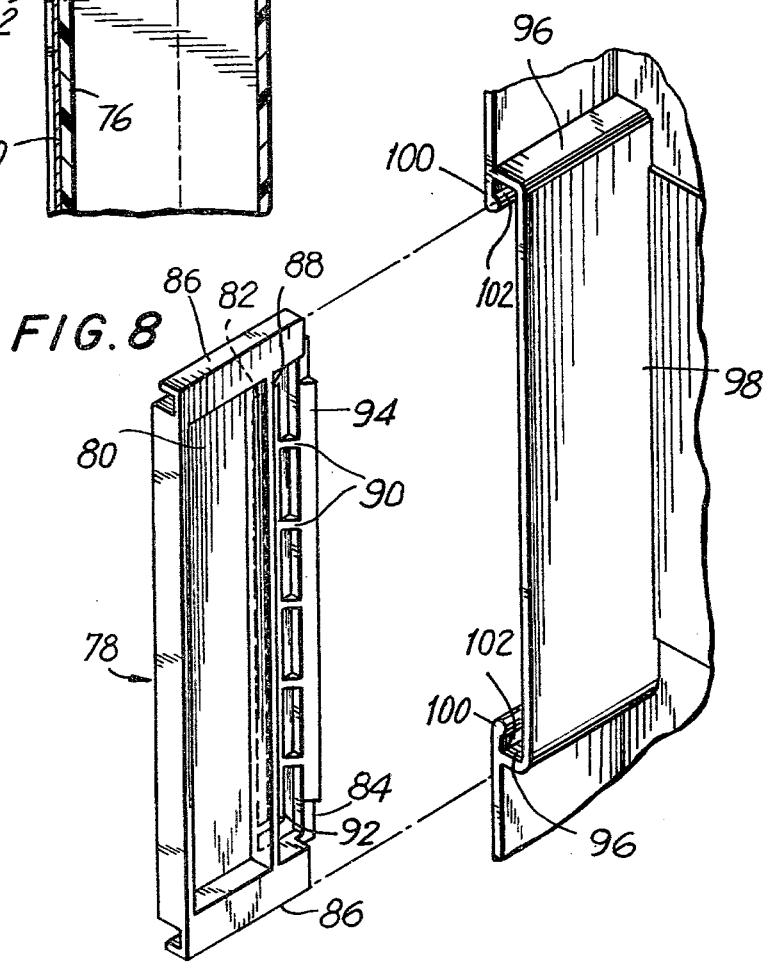
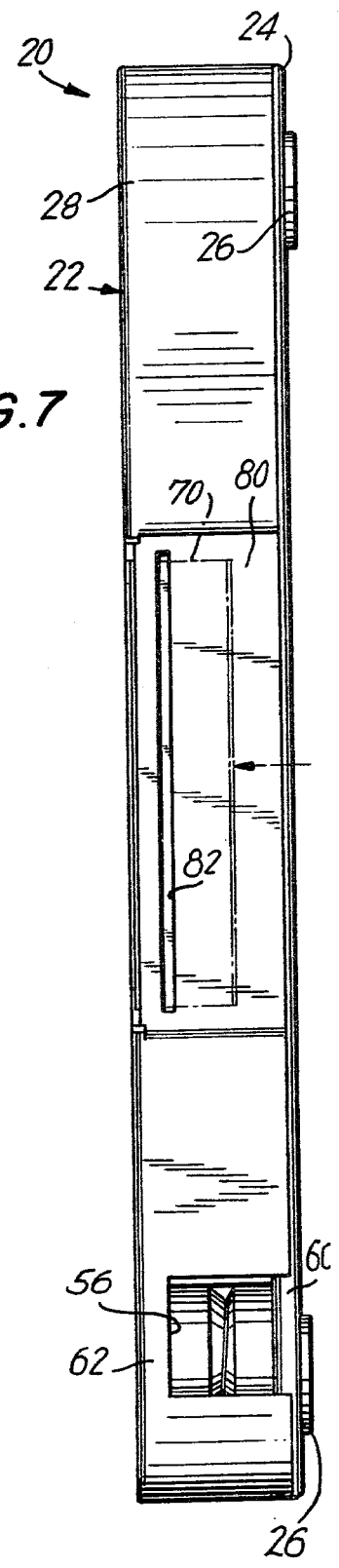

STORAGE AND SHIPPING CONTAINER

BACKGROUND OF THE INVENTION

This invention relates generally to a storage and shipping container especially suitable for use with film or videotape cassettes. Such shipping containers are generally subject to many shocks and impacts during transport and such shocks can easily cause damage to the cassette within. Furthermore, such containers are reused many times and each use requires new labels. These labels must be securely attached, so that they will not become dislodged during transit yet must be easily removed so that they may be replaced with new labels. The present construction represents an improved approach to providing a container and especially a molded container that protects the enclosed cassette against shocks and provides secure means for label mounting while permitting easy replacement. The container is also designed for easy storage and transport.

SUMMARY OF THE INVENTION

Generally speaking, in accordance with the invention, a storage and shipping container for such articles as film or videotape cassettes is provided, which protects the enclosed article from shocks occurring during transit and permits the inspection and removal of a shipping label as well as end labels for identifying the contents. Openings are provided through which a finger may be inserted to aid in carrying the container. The container is comprised of two portions, the lower portion contains a peripheral wall which abuts the periphery of the article and an outer wall extending outwardly from the upper portion is spaced apart from the peripheral wall so as to absorb shocks occurring to the container.

Accordingly, it is an object of this invention to provide an improved storage and shipping container which protects its contents against shocks occurring to the container.

Another object of this invention is to provide an improved container which provides a secure mounting of removable labels at the ends thereof.

A further object of this invention is to provide an improved container which provides a secure means for releasably mounting a shipping label.

Another object of this invention is to provide an improved container containing openings to aid in carrying the container.

Still another object of this invention is to provide an improved container that may be readily manufactured by molding processes.

Still other objects and advantages of the invention will in part be obvious and will in part be apparent from the specification.

The invention accordingly comprises the features of construction, combinations of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 3 is a partial sectional view taken along line 3—3 of FIG. 2 with a finger inserted for carrying shown in phantom;

FIG. 4 is an elevational view of an end of the container of the instant invention;

FIG. 5 is a partial sectional view taken along line 5—5 of FIG. 3;

FIG. 6 is a partial sectional view taken along line 6—6 of FIG. 1;

FIG. 7 is a side elevational view of the container of the instant invention; and FIG. 8 is an exploded perspective view of the bezel strap and its mounting structure.

DETAILED DESCRIPTION OF THE PREFERRED EMBODIMENTS

Figure 1:
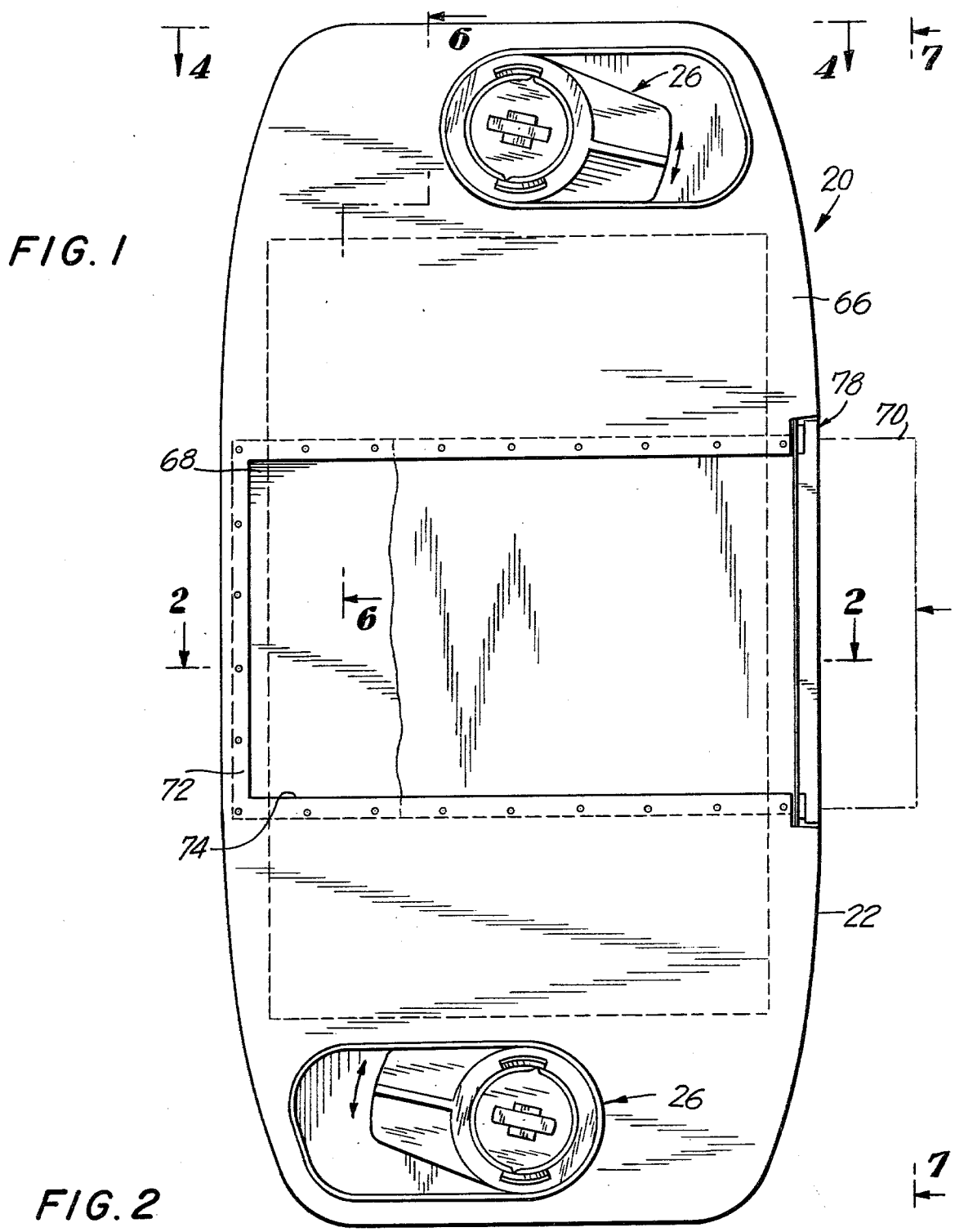
FIG. 1 is a top plan view of a storage and shipping container constructed in accordance with the preferred embodiment of the instant invention with a shipping label shown partially in phantom and cut away.
Figure 2:
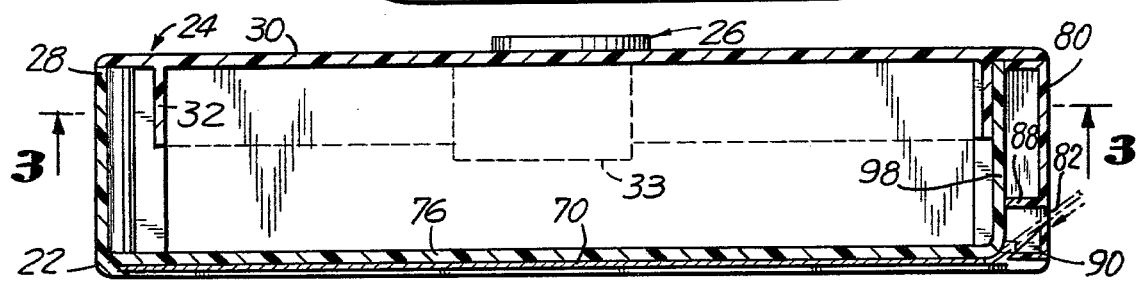
FIG. 2 is a sectional view taken along line 2—2 of FIG. 1.

A videotape storage and shipping container indicated generally at 20 (upside down as viewed in FIG. 2) includes an upper portion 22 and a lower portion 24 which may be joined together by locking means 26 located at each end of shipping container 20. A peripheral outer wall 28 extends downwardly from upper portion 22 and its lower edge contacts and abuts the periphery of lower portion 24. Lower portion 24 includes a base panel 30 which forms the bottom wall of shipping container 20. Upstanding from base panel 30 is a rectangular peripheral wall 32 which extends upwardly only partially the height of outer wall 28 and whose longitudinal walls 33 are spaced apart from outer wall 28. Peripheral wall 32 surrounds the periphery of the article, such as a videotape cassette, to be shipped. As outer wall 28 is spaced from peripheral wall 32, shocks to the outer wall and the edges of the container will be absorbed by the outer wall by deflection and not transferred to the cassette.

The container constructed in accordance with the instant invention may be merely changing the configuration of base panel 30 be used to ship a variety of film and videotape containers, the container illustrated is for use with a common type of commercial videotape cassette. A pair of upstanding cylindrical members 34 extend from base panel 30 and engage the spindle openings in the videotape cassette for locating same. Peripheral wall 32 has an offset portion 36 along one of its longitudinal walls 33 so as to prevent contact with the hinged metal door found on such cassettes.

Base panel 30 includes an opening 37 at each end for engagement with locking means 26 for releasably joining together upper portion 22 and lower portion 24.

As best seen in FIGS. 3 and 4, each end 38 of container 20 carries an end label mounting means 40 which permits a label 41 to be securely yet removably affixed to an end of container 20. An end label would normally be used for identifying the contents of the container during storage or use. End label mounting means 40 is integrally molded with upper portion 22, and includes a rear wall 42 and side walls 44 extending inwardly from end 38. Walls 46 extend perpendicularly to walls 44 and include a projection 48 for engagement with the lateral edge of label 41. The natural resiliency of label 41 securely holds the label between projections 48 and a centrally located projection 50 extending from rear wall 42 as the projections are not coplanar. The longitudinal edges of label 41 are engaged by wall 52 extending upwardly from base panel 30 and a pair of walls 54 extending downwardly from upper portion 22. When upper and lower portions 22 and 24, respectively, are separated, label 41 can be easily changed.

Each end portion 38 of shipping container 20 also contains an opening 56 for insertion of a finger to aid in carrying container 20. Opening 56 is bounded by a transverse wall 58 extending downwardly from upper portion 22 which extends to contact base portion 30 of lower portion 24 and extends laterally across container 20 abutting the transverse walls 35 of peripheral wall 32. The opposite side of opening 56 is bounded by a shorter wall 60 which extends inwardly from outer wall 28, and which permits a finger to be inserted so as to contact wall 60 as well as the back of wall 42. Opening 56 is bounded at its upper end by a wall 62 extending downwardly from upper portion 22 and is bounded about its lower periphery by means of a wall 64 extending upwardly from base panel 30. The finger opening is of particular significance when multiple containers 20 are stacked together using locking means 24. If for example, six containers are loaded and stacked, the handle created by the multiple exposed finger opening permits the stack to be readily carried.

A panel 66 forming the top surface of upper portion 22 includes a recessed surface 68 for receiving a mailing label 70. Recessed surface 68 has a lip 72 overlying and surrounding three edges thereof to define a circumferential slot 74. Label 70 is supported on recessed surface 68 of panel 66, the remaining edge of label 70 underlies a bezel strap 78 mounted to upper portion 22. Label 70 may be inserted and removed when bezel strap 78 is in place, as will hereafter be further described.

As seen in FIGS. 7 and 8, bezel strap 78 has an outer panel 80 having a slot 82 therein for insertion therethrough of label 70. The upper edge 84 of bezel strap 78 is a flush fit with the top surface of panel 66 of upper portion 22 when bezel strap 78 is inserted. Each end of bezel strap 78 has a U-shaped leg 86, the outer arms of which taper from a widest point proximate panel 30 to a narrowest point proximate panel 66.

A ledge 88 extends inwardly from the lower edge of slot 82; extending between upper edge 84 and slot 82 are a number of triangular label guides 90 which extend between a beveled portion 92 located above slot 82 in outer panel 80 to a beveled portion 94 along the underside of upper edge 84 forming a diagonal guide for the insertion of label 70.

Outer wall 28 of upper portion 22 of container 20 is recessed proximate recess 68 forming perpendicular walls 96 and a recessed wall 98. Extending from each perpendicular wall 96 is an arm 100 having a rounded end, which along with perpendicular wall 96 and recessed wall 98 forms a channel 102 to receive legs 86 of bezel strap 78.

When lower portion 24 is removed, bezel strap 78 may be inserted into channel 102. After bezel strap 78 is in place, label 70 is inserted into shipping container 20 by placing it in slot 82. Label 70 will then be guided by label guides 90 and beveled edges 92 and 94 into and under lips 72 of panel 66. The length of label 70 may be so adjusted so that the end portion of it will remain under edge 88 and its natural resiliency will cause it to be secured firmly in place.

The shipping container constructed in accordance with the instant invention provides a secure shock-free mounting for a videotape cassette. Peripheral wall 32 surrounding the cassette is at all times spaced apart from outer wall 28 of container 20 and outer wall 38 is free to deflect should container 20 be subjected to shocks. Furthermore, container 20, constructed in accordance with the invention, provides secure yet removable means for mounting a shipping label as well as end labels. Container 20 also provides means for hand-carrying the container.

It will thus be seen that the objects set forth above, among those made apparent from the preceding description, are efficiently atained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A resilient plastic storage and shipping container for an article comprising first and second separable halves and means for releasably securing together said first and second halves, said first half having a first panel forming one side of said container and means for positioning the article on said first panel with all edges of said first panel extending beyond the article, said second half having a second panel forming the other side of said container and a resilient peripheral outer wall forming the end walls of said container, said first and second panels overlying one another in spaced relation when said halves are secured together, said peripheral outer wall having a free edge proximate but disengaged from said first panel when said havles are secured together, said peripheral outer wall being spaced from said positioning means and the article whereby blows and shocks applied to the end walls of said container during shipping will be absorbed by resilient deflection of said peripheral outer wall and will not be transmitted to the article.

2. A shipping container as claimed in claim 1, wherein said positioning means comprises a wall abutting at least a portion of the periphery of said article.

3. A shipping container as claimed in claim 1, further including at least one transverse wall extending across said container and being joined at each end to said peripheral wall.

4. A shipping container as claimed in claim 3, wherein said positioning means comprise a wall abutting at least a portion of the periphery of said article and said at least one transverse wall abuts said wall abutting said portion of said periphery of saide article.

5. A shipping container as claimed in claim 3, wherein said half securing means are disposed between said at least one transverse wall and the end of said container.

6. A shipping container as claimed in claim 1, further including an opening in said peripheral wall, said opening being of sufficient size for insertion of a finger therein.

7. A shipping container as claimed in claim 6, further including a transverse wall extending across said container and being joined at each end to said peripheral wall, said transverse wall being located proximate to said opening, said opening including a second wall extending inwardly from said opening.

8. A shipping container as claimed in claim 1, wherein said peripheral wall includes means for securing a label to at least one end of said container.

9. A shipping container as claimed in claim 8, wherein said end label securing means includes a wall offset behind said peripheral wall, said offset wall including a projection abutting the back of said label, said peripheral wall including a projection on each side of said projection on said offset wall for abutment with the front lateral edge of said label, said label being held in place by its natural resiliency in engagement with said projections.

10. A shipping container as claimed in claim 9, wherein said label securing means includes at least one wall extending from at least one of said first and second halves, said extending wall engaging a longitudinal edge of said label.

11. A shipping container as claimed in claim 1, wherein said article is a cassette including spindle openings, at least one of said halves of said container including members for engagement with said spindle openings in said cassette.

12. A resilient plastic storage and shipping container for an article comprising first and second separable halves and means for releasably securing together said first and second halves, said first half having a first panel forming one side of said container, said second half having a second panel forming the other side of said container, said first and second panels overlying one another in spaced relation when said halves are secured together, a pheripheral wall extending outwardly from one of said panels toward the other of said panels when said halves are secured together, said peripheral wall having a free edge proximate but disengaged from said other panel when said halves are secured together, said peripheral wall being narrow as compared with the longitudinal and lateral extents of said first and second panels, and an opening in said peripheral wall and adapted to be exposed when multiple containers are in engagement along said first or second panels, said openings being of sufficient size for insertion of a finger therein.

* * * * *